April 28, 1959
J. BOSCH
2,884,531
CLOSED LOOP DISCONTINUOUS CONTROL SYSTEM
FOR PRODUCTION OR PROCESSING MACHINES
Filed Feb. 15, 1955
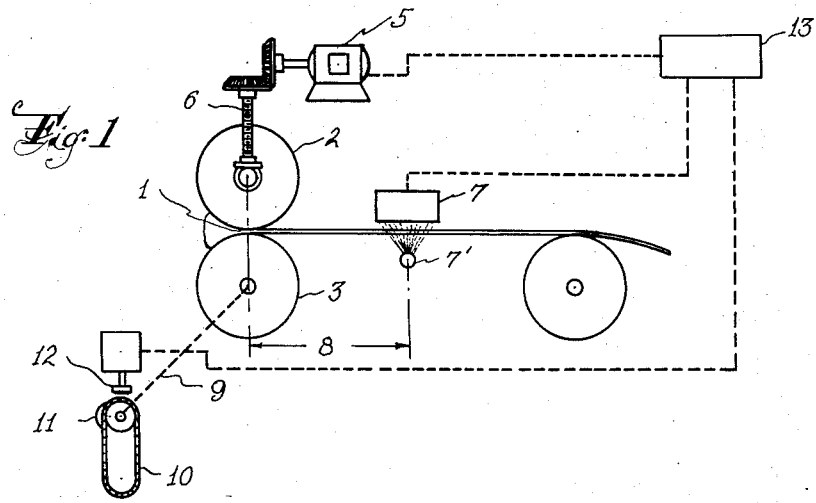
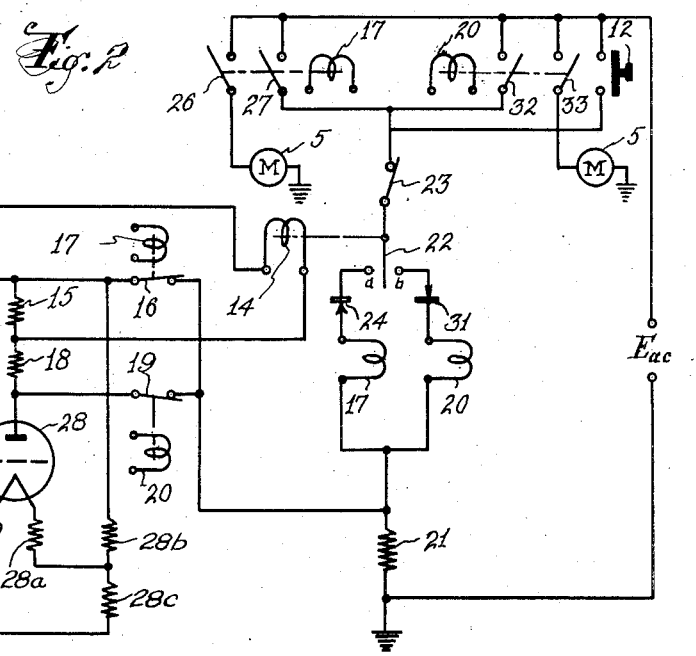
Inventor:
Julius Bosch
By Orin R. Swern
his Attorney

United States Patent Office 2,884,531
Patented Apr. 28, 1959

2,884,531

CLOSED LOOP DISCONTINUOUS CONTROL SYSTEM FOR PRODUCTION OR PROCESSING MACHINES

Julius Bosch, Erlangen-Bruck, Germany, assignor to Frieseke & Hoepfner G.m.b.H., Erlangen-Bruck, Germany, a firm Application February 15, 1955, Serial No. 488,383

Claims priority, application Germany February 16, 1954

18 Claims. (Cl. 250—83.3)

My invention relates to control systems. More particularly the invention relates to a closed loop discontinuous control system for production or processing machines.

Electric motors used in control systems are generally fixed speed motors and for this reason are not very accurate positioning devices. They tend to overshoot desired positions and in continuous control systems "hunting" results. Difficulty is encountered for this reason when utilizing control systems having fixed speed motors for positioning purposes. This is especially true in the attempted regulation of production or processing machines where dead time (that is time for the finished product to travel from the machine to a measuring means for producing an error signal) is long. Further difficulty is encountered where the dead time is variable.

It is a prime object of my invention to provide a control system which will eliminate the foregoing difficulties and provide an effective control for processing or production machinery.

I propose a closed loop discontinuous system which renders a fixed speed motor reliable as a positioning device, and which control system operates reliably without overshoot or hunting. In accordance with my invention the operation of the control system is initiated cyclically and is completed at a time when the thickness of the then being processed or produced portion of the material is of the desired value. The time interval between successive cycles is adjusted according to the speed of the machine which it regulates. A measuring relay is energized by a potential having a magnitude dependent upon a measured error signal and a positioning motor is controlled by the relay to operate in one direction or another according to whether the error signal is positive or negative. Circuit means are provided for building up a potential in opposition to the potential energizing the measuring relay to ultimately cause its de-energization, whereupon the motor is de-energized. The building up of the counter-potential is timed to cause the motor which operates at a fixed speed to assume a position after its de-energization such that an appropriate adjustment is made by the motor in accordance with its positioning function according to the magnitude of the measured error signal.

The invention will be more fully set forth in the following description referring to the accompanying drawings, and the features of novelty will be pointed out with particularity in the claims annexed to and forming a part of this specification.

Referring to the drawing, Fig. 1 is a diagrammatic illustration showing my control system as applied to a calender machine for rolling plastic sheet material to a desired thickness. Fig. 2 is a diagrammatic representation showing circuit details of the control system.

The calender machine of Fig. 1 forms a plastic sheet by rolling plastic material through the slit 1 between calender drums 2 and 3. The width of slit 1 which determines the thickness of the sheet is controlled by fixed speed adjustment motor 5, the motor being operated to raise or lower the upper drum through rod 6 to compensate for variations from a desired thickness for the material. Heretofore mechanical contact or touch devices were used to ascertain the amount by which the thickness of the material varied from the desired value. In my control system however a continuous measuring non-contact device 7 is provided which measures the thickness of material by detection in an ionization chamber of unabsorbed rays from a radio isotope 7′ passing through the material. Operation of the control system is begun cyclically and is continued for a period of time according to the measured thickness of the material in such a manner that an appropriate adjustment is made for maintaining a desired thickness of material. Thus the duration of control circuit operation is not primarily dependent on the dead time (the time for the material to travel the distance 8). A cycle begins each time a predetermined length of material passes through the rollers. This is accomplished by mechanism geared through connection 9 to the shaft of calender roller 3 including the endless chain 10, a trip 11 secured thereto and plunger contact 12. Each time the calender roller 3 travels a certain distance rolling out a preselected length of material the trip 11 is moved into position by chain 10 to momentarily actuate contact 12 thereby commencing a cycle of control circuit operation.

I propose that suitable circuit means of the type shown in my copending application Serial No. 473,002 filed December 3, 1954 be provided in connection with the measuring device 7 for providing a continuous control voltage or error signal $E_c$ (Fig. 2) positive or negative with respect to ground representing according to a substantially linear relationship the extent to which the thickness of the sheet as measured by the device is greater or less respectively than the desired thickness. The control circuit of my system generally indicated at 13 in Fig. 1 and shown in detail in Fig. 2 is operated intermittently according to such control voltage generally as follows.

The voltage $E_c$ is applied continuously to the control circuit, whether the circuit be active or quiescent. In the absence of error or with an error corresponding to a deviation of material thickness within predetermined permissible tolerances $E_c$ is at or near zero volts with respect to ground. In such case the control circuit remains quiescent even though contact 12 is periodically closed momentarily. With $E_c$ other than at or near zero volts, the control circuit is not activated until contact 12 is closed, but closure provides a timing signal which triggers the circuit into operation. Thereafter the operation is self-sustained even though contact 12 is immediately reopened. The circuit will remain active for such period of time as is necessary to adjust the width of the slit 1 to the value required for proper material thickness with due allowance for the time required for motor 5 to come to a stop. It is to be understood that the active period must end before the voltage $E_c$ reverts to its desired zero or near zero value so that at the end of said period the sense or polarity of $E_c$ is still the same as throughout said period, as otherwise adjustment of the width of slit 1 would be excessive and a thickness deviation in the opposite direction, i.e. overshoot or hunting would be introduced.

The control circuitry includes the measuring relay 14 which is energized by control voltage $E_c$ according to the operation of the measuring device 7. Relay 14 is energized by flow of current in the circuit extending through the relay coil, over resistor 15 and contact 16 of relay 17, resistor 18 and contact 19 of relay 20, and through resistor 21 to ground. The control circuit operation admits of three possible combinations of conditions of the relays 17 and 20: one deenergized and the other energized or deenergized. Relay 14 is a polarized relay having a contact arm 22 which assumes an intermediate normal or neutral position between contact points *a* and *b* when the relay is de-energized, but is moved upon energization of the relay to a position in contact with contact point *a* or contact point *b* according to whether the relay is energized by a positive or a negative potential. Assuming a positive potential indicating that the thickness of the plastic strip is greater than desired, contact arm 22 is positioned to the left as shown in the drawing in contact with the contact point *a*. When the plunger contact 12 is actuated by the trip 11 a circuit is completed for relay 17 extending from A.C. voltage source $E_{ac}$ over the contact 12, contact 23, contact 22a, through the rectifier 24, the coil of relay 17, and resistor 21 to ground. Relay 17 picks up opening contacts 16 and 25, and closing contacts 26 and 27. Current in the circuit for the relay 17 is rectified by means of rectifier 24 and flows in a direction from ground into resistor 21 tending to place the ungrounded end of resistor 21 at a potential negative with respect to ground. Because of this negative potential the current through the measuring relay 14 is increased and the measuring relay responds by drawing the contact arm 22 more tightly against the contact point *a* to thereby prevent chattering of the relay contact.

When contact 27 of relay 17 closes it completes a circuit for the relay 17 extending from the voltage source $E_{ac}$ over the contact 27, contact 23, contact 22a through rectifier 24, the coil of relay 17 and resistor 21 to ground. This circuit maintains relay 17 energized when contact 12 opens as the chain 10 moves beyond the position in which plunger contact 12 is depressed by the trip 11. Contact 26 of relay 17 connects the motor 5 to the A.C. voltage source $E_{ac}$ and the motor rotates in a direction to move calender roller 2 closer to roller 1 so as to diminish the thickness of the plastic sheet.

The control circuit is subsequently disabled and motor 5 subsequently is stopped by the operation of the triode 28 and circuitry associated therewith, which are energized by the voltage source $E_{dc}$. The cathode of triode 28 is returned via resistor 28a to the junction of resistors 28b and 28c whose other ends are respectively connected to the positive and negative terminals of the source $E_{dc}$. Resistors 28b and 28c thus provide a bias voltage for the cathode which is sufficiently positive with respect to the negative terminal of the source $E_{dc}$ as to cause triode 28 to be cut off in the quiescent condition, wherein its grid is short-circuited to the negative terminal through contacts 25 and 34. The anode of triode 28 is returned through resistors 18 and 15 to the positive terminal of source $E_{dc}$ and additionally in the quiescent condition it is short-circuited thereto through contacts 19 and 16. Such short-circuiting however does not matter in the quiescent cut-off condition. With either of the contacts 19 or 16 opened the resistors 15 and 18 become effective in passing an anode current increasing with time so as to reduce the current through relay 14 and ultimately restore contact 22 to its quiescent condition thereby disabling the control circuit..

Reverting to the assumed condition of $E_c$ being positive and relays 14 and 17 energized, contact 25 of relay 17 disconnects the grid of triode 28 from the negative terminal of the D.C. voltage source $E_{dc}$ whereupon the potential on the grid is gradually increased by the charging of condenser 29 through adjustable resistor 30. At the outset no anode current flows through tube 28 because of the negative bias of the grid with respect to the cathode; however as the potential on the grid increases becoming more positive, anode current flows through the tube via resistors 15 and 18 building up a potential between these resistors in opposition to the control voltage so that the current through relay 14 is gradually decreased. After a period of time relay 14 drops out opening contact 22a. When contact 22a opens, it opens the energizing circuit for relay 17 which releases to open contacts 26 and 27, and close contacts 16 and 25. Contact 26 disconnects the motor 5 from the A.C. voltage source $E_{ac}$, and the motor runs to a stop. Contact 25 reconnects the grid of tube 28 to the negative terminal of the D.C. voltage source and current flow through the tube ceases. As hereinbefore pointed out, the voltage from the measuring device 7 is linearly proportional to the amount by which the thickness of the sheet material as measured by the gauge deviates from the desired thickness. The potential built up by the flow of anode current in opposition to the potential from the device 7 while condenser 29 charges also varies in a substantially linear manner with time over the time periods involved for effecting the release of relay 14, and by proper adjustment of resistor 30, relay 14 is caused to release at the proper moment according to the then existing magnitude of the error signal, such that the motor stops in a position in which calender roller 2 is positioned to correct the deviation and provide the desired thickness of sheet material.

In the assumed case of a positive error signal representing excessive thickness of sheet material, calender roller 2 is moved just close enough to the roller 3 to provide the proper thickness of sheet material. The control system is operated in a similar manner to that described for a negative error signal which indicates that the sheet material is thinner than desired. In the case of a negative error signal relay 14 is energized by passage of current in the opposite direction over the previously described circuit, however, the relay by reason of the opposite current direction closes contact 22b rather than contact 22a and relay 20 is picked up rather than relay 17. Rectifier 31 passes current in an opposite direction from that of rectifier 24 and contact arm 22 is pulled tightly against contact point *b*. Relay 20 closes contacts 32 and 33, and opens contacts 34 and 19. A current is provided for relay 20 over a circuit including contact 32 for maintaining the relay energized after contact 12 opens. When contact 33 of relay 20 closes motor 5 is energized by the A.C. voltage source $E_{ac}$ and operated in a direction to move roller 2 apart from roller 3, it being understood that suitable means are provided for operating the motor in opposite directions according to whether relay 17 or 20 is energized. This may be accomplished for example in the case of a two phase induction motor merely by reversing the leads of either phase when relay 20 picks up. Contact 34 disconnects the grid of tube 28 from the negative bias potential and current flows through the tube to build up a potential in opposition to the negative potential from the measuring device 7 thereby ultimately releasing relay 14. Contact 22b opens, relay 20 releases and current flow through tube 28 ceases. The motor 5 stops at a position according to the then existing magnitude of the negative error signal in which roller 2 is positioned to provide the desired thickness of sheet material.

Preferably the contact 23 is controlled by an automatic locking relay which normally maintains the contact closed. The relay should however be controlled as for example by maximum-minimum contact means to open the contact and effect the de-energization of the motor in the event the deviation in thickness of the material is greater or less than prescribed limiting maximum and minimum values respectively.

It should be understood that this invention is not limited to specific details of construction and arrangement thereof herein illustrated, and that changes and modifications may occur to one skilled in the art without departing from the spirit of the invention.

What I claim is:

1. In a control system the combination of a fixed speed motor, means for providing an error potential, relay means controlled according to the polarity of said error signal, means for operating said motor intermittently in one direction or another according to the operation of said relay means, and circuit means connected with said relay means for building up a potential in opposition to said error potential in a period of time according to the magnitude of the error potential causing said relay means to effect the de-energization of the motor.

2. In a control system the combination of a fixed speed motor, means for providing an error potential, a polarized relay having a contact positionable according to the polarity of the error potential, means for operating said motor intermittently in one direction or another according to the position of the relay contact, means for increasing current in the relay on initiating operation of the motor to prevent chattering of the relay contact, and circuit means connected with said relay for building up a potential in opposition to said error potential in a period of time according to the magnitude of the error potential causing said relay means to effect the de-energization of the motor.

3. The combination as defined in claim 1 in which the means for building up the counter potential includes a resistor and a capacitor charging through said resistor during the operation of the motor, and a vacuum tube having the grid connected to said resistor and capacitor, said tube passing an anode current according to the potential across the capacitor for generating the counter potential.

4. A control system for maintaining a desired thickness of sheet material produced by rolling out the material between the cylindrical rollers of a calender machine comprising a fixed speed motor means for continuously determining the thickness of the sheet material and providing an error potential representing deviations in thickness from a desired value, relay means controlled according to the polarity of said error signal, means for operating said motor intermittently in one direction or another according to the operation of said relay means, and circuit means for building up a potential in opposition to said error potential in a period of time according to the magnitude of the error potential causing said relay means to effect the de-energization of the motor such that the rollers are positioned properly for the desired thickness.

5. In manufacturing apparatus for producing a continuous length of production material, a control system comprising means for producing after a predetermined time delay subsequent to the production of a given portion of said material an error signal representing in magnitude and sense the instant magnitude and sense of deviation in thickness of such given portion from a predetermined standard thickness, means normally disabled and adapted upon enablement to adjust said apparatus towards production of material of said standard thickness in accordance with the sense of the instant error signal, means for periodically producing a trigger signal, means rendered responsive upon coincidence of a trigger signal and of the error signal reflecting a deviation from said standard for enabling said adjusting means and for generating a timing signal building up with time, means continuously comparing the instantaneous magnitudes of said timing and error signals for once more disabling said adjusting means and for terminating said timing signal, both at a time when the error signal is still of the same sense as at said coincidence, thereby positively to assure that the then produced material portion does not deviate from standard in opposite sense.

6. The combination as defined in claim 5 wherein the timing signal builds up substantially linearly with time.

7. The combination as defined in claim 5 wherein the adjusting means includes fixed speed motor means operatively connected to the manufacturing apparatus, said motor means being normally at stand-still and enabled at the aforesaid coincidence to rotate in either direction in accordance with the sense of the error signal to adjust said apparatus toward production at standard thickness, the comparison means being effective ultimately to revert said motor to stand-still.

8. The combination as defined in claim 7 with the inclusion of switching means normally in a neutral circuit state and switchable at the aforesaid coincidence to one or another of non-neutral states in accordance with the sense of the error signal, wherein the motor means is rendered operative to run in one direction or the other in accordance with the assumption by said switching means of said one or other non-neutral state, and wherein the comparison means is effective to revert said switching means to its said neutral state thereby to revert said motor means to stand-still.

9. The combination as defined in claim 8 wherein the means for generating the timing signal is actuated responsive to assumption by the switching means of a non-neutral position, and wherein the means for terminating said timing signal is rendered responsive to reassumption by said switching means of its neutral position.

10. The combination as defined in claim 8 wherein the trigger signal is momentary and with the inclusion of means responsive to assumption of the switching means of a non-neutral state to lock said switching means in such assumed non-neutral state even though said trigger signal has terminated.

11. The combination as defined in claim 8 with the inclusion of means responsive to assumption of the switching means of a non-neutral state to lock said switching means in such assumed non-neutral state even though the magnitude of the error signal is reduced.

12. The combination as defined in claim 7 wherein the means for generating the timing signals includes as timing elements a resistor and a capacitor adapted at the aforesaid coincidence to charge through said resistor, the capacitor voltage being the aforesaid voltage building up with time, wherein the comparison means includes circuit means for comparing the capacitor and error voltages and also means responsive to attainment of a predetermined relation of the capacitor and error voltages for reverting the motor means to stand-still and for discharging the capacitor and precluding its recharging until the next of said coincidences.

13. The combination as defined in claim 12 wherein the comparison means includes an amplifier device having at least three terminals and normally biased for a predetermined state of current conduction between two of said terminals, supply circuit means for said device for passing a current through said two terminals including a resistor common to a circuit of the error signal producing means, a third of said terminals being connected to said capacitor, whereby when said capacitor charges, said device conducts a current through said two terminals in accordance with said capacitor voltage to develop across said common resistor a potential in opposition to said error signal potential, the means for reverting the motor means to stand-still and for discharging the capacitor being rendered effective upon attainment of a predetermined relation of said opposition and error voltages.

14. The combination as defined in claim 13 wherein the amplifier device is a triode normally biased to cut-off, having its grid connected to the capacitor and having connected in its anode circuit the aforesaid resistor common to a circuit of the error signal producing means, the charging of the capacitor producing an anode current increasing with time to produce across said common resistor building up of the aforesaid opposition potential.

15. The combination as defined in claim 12 wherein the comparison means includes an amplifier device having at least three terminals and normally biased for a predetermined state of conduction between two of said terminals, supply circuit means for said device for passing a current through said two terminals, a pair of resistors included permanently in an output circuit of the error circuit producing means and additionally connectable for active inclusion in said supply circuit means responsive to assumption by the aforesaid switching means of either of its non-neutral states, the third of said terminals being connected to the capacitor whereby when said capacitor charges said device conducts a current through said two terminals in accordance with said capacitor voltage to develop across one or the other of said two connectable resistors a potential in opposition to said error signal potential in accordance with the assumption of said switching means of its one or the other non-neutral states, the means for reverting the motor to standstill and for discharging the capacitor being rendered effective upon attainment of a predetermined relation of said opposition and error voltages.

16. The combination as defined in claim 15 wherein the output circuit of the error signal producing means is connected across a pair of output circuit terminals and wherein the supply circuit means includes a source of voltage having a pair of terminals independent of the said pair of output circuit terminals, wherein a terminal of the amplifier device is connected permanently through the aforesaid two resistors, connectable for active inclusion, in series with one another with reference to said device to one terminal of said voltage source, and is additionally short-circuited thereto with the aforesaid switching means in its neutral state through two switching elements switchable alternatively to open said short-circuit responsive to assumption of one or the other of the aforesaid non-neutral states, said two connectable resistors in cooperation with said short circuit being connected in parallel with one another with reference to said error signal producing means in its said output circuit, whereby upon assumption of said one or the other of the non-neutral states said device passes through said connectable resistors a current building up with time through both of said connectable resistors and current in said output circuit passes through only one of said connectable for comparison with said current building up with time.

17. The combination as defined in claim 16 wherein the amplifier device is a triode normally biased to cut-off, having its grid connected to the capacitor and having connected from its anode to the aforesaid one terminal of the voltage source the two resistors connectable for active inclusion, the charging of the capacitor producing an anode current increasing with time for comparison with the current in the aforesaid output circuit through the particular one of said two connectable resistors passing the last-mentioned current.

18. The combination as defined in claim 16 wherein the means for discharging the capacitor includes a second pair of switching elements connected in series to short-circuit said capacitor with the aforesaid switching means in its neutral state and also switchable alternatively to open said short-circuit responsive to assumption of one or the other of the aforesaid non-neutral states to permit charging.

References Cited in the file of this patent

UNITED STATES PATENTS

| | | |
|---|---|---|
| 1,989,038 | Brown | Jan. 22, 1935 |
| 2,051,781 | Brown | Aug. 18, 1936 |
| 2,414,524 | Harris | Jan. 21, 1947 |
| 2,566,854 | Rhodes | Sept. 4, 1951 |
| 2,601,060 | Runaldue | June 27, 1952 |
| 2,608,717 | Kay | Sept. 2, 1952 |
| 2,723,350 | Clapp | Nov. 8, 1955 |
| 2,737,186 | Molins et al. | Mar. 6, 1956 |

OTHER REFERENCES

The Iron Age, January 29, 1948, page 69.